United States Patent
Zhao et al.

(10) Patent No.: US 12,488,167 B2
(45) Date of Patent: Dec. 2, 2025

(54) METHOD AND SYSTEM FOR FORWARD SYNTHESIS OF DIGITAL PREDISTORTION NONLINEAR MODEL DERIVED FROM CIRCUIT DESCRIPTION

(71) Applicant: XI'AN JIAOTONG UNIVERSITY, Shaanxi (CN)

(72) Inventors: Xiaolong Zhao, Xi'an (CN); Yongning He, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 19/223,504

(22) Filed: May 30, 2025

(65) Prior Publication Data
US 2025/0291986 A1    Sep. 18, 2025

Related U.S. Application Data

(63) Continuation of application No. PCT/CN2024/107662, filed on Jul. 25, 2024.

(30) Foreign Application Priority Data

Oct. 12, 2023  (CN) .......................... 202311320915.6

(51) Int. Cl.
    *G06F 30/327* (2020.01)
(52) U.S. Cl.
    CPC .................. *G06F 30/327* (2020.01)
(58) Field of Classification Search
    CPC ........ G06F 30/20; G06F 30/367; G06F 30/30; G06F 21/567; G06F 21/554; G06F 3/015;
    (Continued)

(56) References Cited

U.S. PATENT DOCUMENTS

| 9,077,315 B2 * | 7/2015 | Bogdan ............... H04L 25/0398 |
| 2011/0074506 A1 * | 3/2011 | Kleider ................. H03F 1/3294 |
| | | 330/149 |

(Continued)

FOREIGN PATENT DOCUMENTS

| CN | 1360712 A | 7/2002 |
| CN | 103731105 A | 4/2014 |

(Continued)

OTHER PUBLICATIONS

International Search Report in PCT/CN2024/107662 mailed on Oct. 28, 2024, 6 pages.

(Continued)

*Primary Examiner* — Binh C Tat
(74) *Attorney, Agent, or Firm* — PORUS IP LLC

(57) ABSTRACT

Disclosed is a method and system for forward synthesis of a digital predistortion nonlinear model derived from a circuit description, used for nonlinear modeling of a power amplifier. The method includes establishing a frequency band-continuous time-domain expression, transforming the frequency band expression to a baseband expression, and transforming the baseband-continuous time-domain expression to a baseband-discrete time-domain expression. The present disclosure can obtain the DPD nonlinear model by forward synthesis, provide an accurate model structure and initial parameter values for establishing the RF power amplifier model in the power amplifier nonlinear predistortion technology, make full use of the prior knowledge of the RF power amplifier system to obtain the nonlinear model structure that best conforms to the physical essence, and directly obtain the minimum memory depth and nonlinear order, and can be integrated into an RF power amplifier circuit simulation software.

16 Claims, 6 Drawing Sheets

(58) Field of Classification Search
CPC ............ G06F 2218/10; G06F 2218/04; G06F 30/327; G06F 2221/033; G06F 2221/2111; G06F 21/566; G06F 2218/12; H01L 2924/0002; H01L 2924/00; H01L 23/293
USPC .................................................. 716/100–106
See application file for complete search history.

(56) References Cited

U.S. PATENT DOCUMENTS

2011/0075745 A1* 3/2011 Kleider ............ H04L 25/03057
375/260
2022/0200540 A1 6/2022 Kof et al.

FOREIGN PATENT DOCUMENTS

CN 105393452 A 3/2016
CN 115118562 A 9/2022

OTHER PUBLICATIONS

Written Opinion in PCT/CN2024/107662 mailed on Oct. 28, 2024, 6 pages.

* cited by examiner

METHOD AND SYSTEM FOR FORWARD SYNTHESIS OF DIGITAL PREDISTORTION NONLINEAR MODEL DERIVED FROM CIRCUIT DESCRIPTION

CROSS-REFERENCE TO RELATED APPLICATIONS

This application is a Continuation of International Application No. PCT/CN2024/107662, filed on Jul. 25, 2024, which claims priority to Chinese Patent Application No. 202311320915.6, filed on Oct. 12, 2023, the entire contents of each of which are incorporated herein by reference.

TECHNICAL FIELD

The present disclosure belongs to the technical field of digital predistortion of radio frequency (RF) power amplifier systems, and in particular to a method and system for forward synthesis of a digital predistortion nonlinear model derived from a circuit description.

BACKGROUND

In RF power amplifier systems, high power added efficiency (PAE) and high linearity are typically mutually contradictory. To maximize the efficiency of the RF power amplifier systems, it is essential to address nonlinearity problems, with digital predistortion (DPD) being one of the most commonly employed techniques. In 5G systems, where power density and operation bandwidth are further increased, the use of GaN devices introduces additional challenges including the thermal effect and the trapping effect, making the nonlinearity problems in the 5G systems even more complex. The conventional DPD technology primarily relies on a "black box model", i.e., a generic mathematical model used to describe nonlinear systems for modeling of the RF power amplifier systems. Due to the lack of physical prior knowledge, the "black box model" struggles to simultaneously meet the application requirements of both high accuracy and low complexity when dealing with sophisticated power amplifier circuit structures.

Compared with the "black box model", the nonlinear effect can also be characterized through a physical model. During circuit level simulation of RF power amplifier design, a large signal model incorporating the nonlinear effect is employed to enable more accurate evaluation of circuit parameters such as efficiency, 1 dB compression point, and third-order intercept point. Accordingly, theoretically, an accurate nonlinear representation model, referred to as a "full physical model", can be derived through comprehensive physical analysis based on the circuit description of the RF power amplifier systems. However, the current circuit level simulation model cannot be directly applied to the DPD technology.

First, the circuit level model of the RF power amplifier is a bandpass model, while the DPD technology requires a baseband model. Second, the circuit level model of the RF power amplifier is a continuous time-domain model, while the DPD technology requires a discrete time-domain model. Finally, the circuit level model of the RF power amplifier is numerically solved as simultaneous integro-differential equations during simulation, where analytical expressions of the input-output relationship are not required. In contrast, the DPD technology requires the analytical expressions of the input-output relationship.

SUMMARY

The objective of the present disclosure is to overcome the deficiencies in the prior art, and the present disclosure provides a method and system for forward synthesis of a digital predistortion nonlinear model derived from a circuit description.

The present disclosure is achieved by adopting the following technical solutions:

A method for forward synthesis of a digital predistortion nonlinear model derived from a circuit description, used for nonlinear modeling of a power amplifier, comprising:
1) obtaining an equivalent circuit model of a radio frequency (RF) power amplifier system;
2) establishing, based on the equivalent circuit model, a frequency band-continuous time-domain integro-differential equation system;
3) simplifying and reorganizing the frequency band-continuous time-domain integro-differential equation obtained in the step 2) to transform the frequency band-continuous time-domain integro-differential equation into a combination of frequency band-continuous time-domain integro-differential equations for a memory-based linear subsystem and a frequency band-continuous time-domain equations for a memoryless nonlinear subsystem;
4) transforming a frequency band-continuous time-domain integro-differential equation into a baseband-continuous time-domain equation using a harmonic balance approach, including transforming the frequency band-continuous time-domain integro-differential equation equations for the memory-based linear subsystem obtained in the step 3) into baseband-continuous time-domain equations for the memory-based linear subsystems for the memory-based linear subsystem, and transforming the frequency band-continuous time-domain equations for the memoryless nonlinear subsystem obtained in the step 3) into baseband-continuous time-domain equations for the memoryless nonlinear subsystem;
5) performing Laplace transform on the baseband-continuous time-domain equations for the memory-based linear subsystem to obtain a Laplace transform expression;
6) transforming the Laplace transform expression obtained in the step 5) into a discrete frequency-domain system of equations using bilinear z-transform;
7) performing inverse z-transform on the discrete frequency-domain system of equations obtained in the step 6) and reorganizing to obtain a system of difference equations with constant coefficient;
8) discretizing and reorganizing the baseband-continuous time-domain equations for the memoryless nonlinear subsystem obtained in the step 4) to obtain baseband-discrete time-domain equations for the memoryless nonlinear subsystem; and
9) reorganizing the system of difference equations with constant coefficient obtained in the step 7) and the baseband-discrete time-domain equations for the memoryless nonlinear subsystem obtained in the step 8) to obtain a baseband-discrete time-domain nonlinear model of the RF power amplifier system.

In some embodiments, the equivalent circuit model in the step 1) includes a thermal effect and a trapping effect of a transistor.

In some embodiments, the transistor adopts a GaN device.

In some embodiments, the frequency band-continuous time-domain integro-differential equation system in the step 2) is obtained by transforming the equivalent circuit model in the step 1) based on the Kirchhoff's law and network parameter expression transform.

In some embodiments, the network parameter expression transform is configured to process distributed parameter elements in the equivalent circuit model of the step 1).

In some embodiments, the step 3) is achieved by decoupling an integro-differential operation and a nonlinear operation on a nonlinear equation in the frequency band-continuous time-domain integro-differential equation system obtained in the step 2).

In some embodiments, the simplifying described in the step 3) is achieved by selecting state variables as unknown quantities through a state space approach to eliminate other unknown quantities, so as to reduce a count of unknown quantities and a count of equations in the integro-differential equation to simplify equation expression.

In some embodiments, the transforming a frequency band-continuous time-domain integro-differential equation into a baseband-continuous time-domain equation includes substituting carrier modulation time-domain expressions of I-channel and Q-channel signals of input signals into the equations obtained in the step 3), and then reorganizing fundamental wave terms using the harmonic balance approach.

A system for forward synthesis of a digital predistortion nonlinear model derived from a circuit description, used for nonlinear modeling of a power amplifier, comprising:

a model acquisition module configured to obtain an equivalent circuit model of an RF power amplifier system;

an equation establishment module configured to establish a frequency band-continuous time-domain integro-differential equation system based on the equivalent circuit model;

a simplification and reorganization module configured to simplify and reorganize the frequency band-continuous time-domain integro-differential equation system to transform the frequency band-continuous time-domain integro-differential equation into a combination of frequency band-continuous time-domain integro-differential equations for a memory-based linear subsystem and frequency band-continuous time-domain equations for a memoryless nonlinear subsystem;

an equation transform module configured to transform a frequency band-continuous time-domain integro-differential equation into a baseband-continuous time-domain equation using a harmonic balance approach, including transforming the frequency band-continuous time-domain integro-differential equations for the memory-based linear subsystem into baseband-continuous time-domain equations for the memory-based linear subsystem, and transforming the frequency band-continuous time-domain equations for the memoryless nonlinear subsystem into a baseband-continuous time-domain equations for the memoryless nonlinear subsystem;

a Laplace transform module configured to perform Laplace transform on the baseband-continuous time-domain equations for the memory-based linear subsystem to obtain a Laplace transform expression;

a bilinear z-transform module configured to transform the Laplace transform expression into a discrete frequency-domain system of equations using bilinear z-transform;

an inverse z-transform module configured to perform inverse z-transform on the discrete frequency-domain system of equations and reorganize to obtain a system of difference equations with constant coefficient;

a discretization module configured to discretize and reorganize the baseband-continuous time-domain equations for the memoryless nonlinear subsystem to obtain baseband-discrete time-domain equations for the memoryless nonlinear subsystem; and a reorganization module configured to reorganize the system of difference equations with constant coefficient and the baseband-discrete time-domain equations for the memoryless nonlinear subsystem to obtain a baseband-discrete time-domain nonlinear model of the RF power amplifier system.

In some embodiments, the equivalent circuit model includes a thermal effect and a trap effect of a transistor.

In some embodiments, the transistor adopts a GaN device.

In some embodiments, the frequency band-continuous time-domain integro-differential equation system is obtained by transforming the equivalent circuit model based on the Kirchhoff's law and network parameter expression transform.

In some embodiments, the network parameter expression transform is configured to process distributed parameter elements in the equivalent circuit model.

In some embodiments, the simplifying and reorganizing the frequency band-continuous time-domain integro-differential equation system includes decoupling an integro-differential equation and a nonlinear operation on a nonlinear equation in the frequency band-continuous time-domain integro-differential equation system.

In some embodiments, the simplifying is achieved by selecting state variables as unknown quantities through a state space approach to eliminate other unknown quantities, so as to reduce a count of unknown quantities and a count of equations in the integro-differential equation to simplify equation expression.

In some embodiments, the transforming a frequency band-continuous time-domain integro-differential equation into a baseband-continuous time-domain equation includes substituting carrier modulation time-domain expressions of I-channel and Q-channel signals of input signals into the equations obtained by the simplification and reorganization module, and then reorganizing fundamental wave terms using the harmonic balance approach.

Compared with the prior art, the present disclosure has at least the following beneficial technical effects.

The present disclosure provides the method for forward synthesis of the digital predistortion nonlinear model derived from the circuit description, which can obtain the corresponding DPD nonlinear model by forward synthesis through the existing equivalent circuit model of the RF power amplifier system, and can provide an accurate model structure and initial parameter values for establishing the RF power amplifier model in the power amplifier nonlinear predistortion technology. The present disclosure has the following advantages.

1. The method for forward synthesis of the digital predistortion nonlinear model derived from the circuit description can make full use of the prior knowledge of the RF power amplifier system to obtain the nonlinear model structure that best conforms to the physical essence.

2. The method for forward synthesis of the digital predistortion nonlinear model derived from the circuit description can directly obtain the minimum memory depth and nonlinear order.
3. The method for forward synthesis of the digital predistortion nonlinear model derived from the circuit description can be integrated into RF power amplifier circuit simulation software.

DETAILED DESCRIPTION

Exemplary embodiments of the present disclosure will be described in detail below with reference to the accompanying drawings. Although exemplary embodiments of the present disclosure are shown in the accompanying drawings, it should be understood that the present disclosure can be implemented in various forms and should not be limited by the embodiments set forth herein. On the contrary, these embodiments are provided in order to enable a more thorough understanding of the present disclosure and to fully convey the scope of the present disclosure to those skilled in the art. It should be noted that, in the absence of conflict, the embodiments of the present disclosure and the features described in the embodiments can be combined with each other. The present disclosure will be described in detail below with reference to the accompanying drawings and the embodiments.

Example 1

Figure 1:
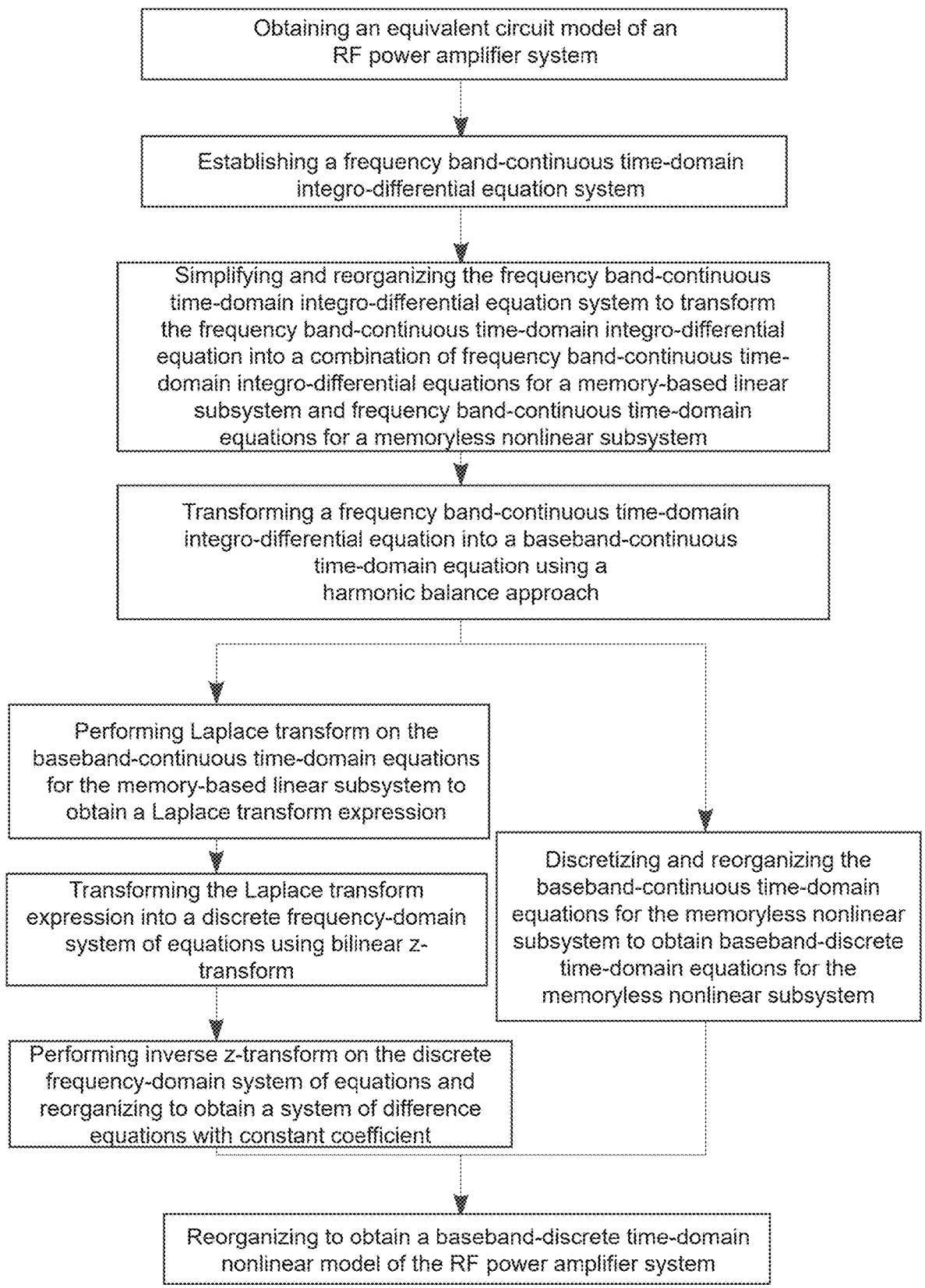
FIG. 1 is a flowchart illustrating forward synthesis of a digital predistortion nonlinear model derived from a circuit description according to some embodiments of the present disclosure.

The present disclosure provides a method for forward synthesis of a digital predistortion nonlinear model derived from a circuit description, and a flowchart of modeling is shown in FIG. 1.

Figure 2:
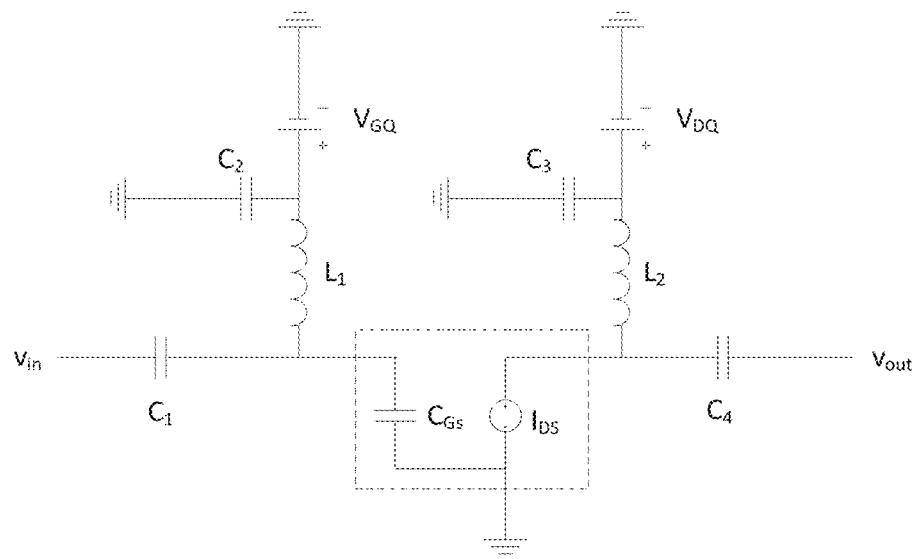
FIG. 2 is an equivalent circuit diagram of an RF power amplifier system according to some embodiments of the present disclosure.

The following takes an RF power amplifier system shown in FIG. 2 as an example to illustrate the beneficial effects of the method for forward synthesis of the digital predistortion nonlinear model derived from the circuit description provided by the present disclosure.

In the example of the RF power amplifier system shown in FIG. 2, a transistor is modeled by equivalent gate capacitance $C_{GS}$ and drain-source current $I_{DS}$, a bias network is composed of inductors and capacitors, and input and output matching networks only retain coupling capacitors.

A nonlinear model is extracted from the RF power amplifier system shown in FIG. 2 based on the method for forward synthesis of the digital predistortion nonlinear model derived from the circuit description provided by the present disclosure:

1) Obtaining an equivalent circuit model of the RF power amplifier system, as shown in FIG. 2.
2) Establishing an expression of frequency band-continuous time-domain integro-differential equation system.

$$V_{GS} = V_{GQ} + v_{GS} \tag{1}$$

$$V_{DS} = V_{DQ} + v_{DS} \tag{2}$$

$$v_{GS} = L_1 \frac{di_1}{dt} \tag{3}$$

$$v_{DS} = L_2 \frac{di_2}{dt} \tag{4}$$

$$C_1 \frac{d(v_{GS} - v_{in})}{dt} + i_1 + C_{GS} \frac{dv_{GS}}{dt} = 0 \tag{5}$$

$$C_4 \frac{d(v_{DS} - v_{out})}{dt} + i_2 + I_{DS} = 0 \tag{6}$$

$$C_4 \frac{d(v_{DS} - v_{out})}{dt} = \frac{v_{out}}{R_{out}} \tag{7}$$

$$I_{DS} = \beta_n (V_{GS} - V_{TH})^2 (1 + \lambda V_{DS}) \tag{8}$$

where $V_{GS}$ and $V_{DS}$ are a gate source voltage and a drain source voltage, respectively; $V_{GQ}$ and $V_{DQ}$ are gate and drain DC bias voltages, respectively, $v_{GS}$ and $v_{DS}$ are gate and drain AC voltages, respectively, $L_1$ and $L_2$ are inductors, $i_1$ and $i_2$ are a current, respectively, t is time, $C_1$ and $C_4$ are capacitors, $V_{in}$ and $V_{out}$ are input and output AC voltages, respectively, $\beta_n$ is an amplification factor, $V_{TH}$ is a threshold voltage, $\lambda$ is a channel length modulation coefficient, and $R_{out}$ is load resistance.

3) Simplifying and reorganizing the frequency band-continuous time-domain integro-differential equation system to transform the frequency band-continuous time-domain integro-differential equation into a combination of frequency band-continuous time-domain integro-differential equations for a memory-based linear subsystem and frequency band-continuous time-domain equations for a memoryless nonlinear subsystem.

The frequency band-continuous time-domain integro-differential equations for the memory-based linear subsystem are expressed as:

$$\frac{dx_1}{dt} = \frac{1}{L_1} x_3 \tag{9}$$

$$\frac{dx_2}{dt} = \frac{1}{L_2} x_4 \tag{10}$$

$$\frac{dx_3}{dt} = \frac{C_1}{C_1 + C_{GS}} \frac{dv_{in}}{dt} - \frac{1}{C_1 + C_{GS}} x_1 \tag{11}$$

$$\frac{dx_4}{dt} = \frac{1}{R_{out}C_4} y + \frac{dy}{dt} \tag{12}$$

where $x_1$, $x_2$, $x_3$ and $x_4$ are unknown state variables, and y is an output.

The frequency band-continuous time-domain equation for the memoryless nonlinear subsystem is expressed as:

$$y = \left[-(x_2 + I_{DQ}) - \beta_n((x_3 + V_{GQ}) - V_{TH})^2(1 + \lambda(x_4 + V_{DQ}))\right]R_{out} \quad (13)$$

where $I_{DQ}$ is a drain bias current.

4) Transforming the frequency band-continuous time-domain integro-differential equation into a baseband-continuous time-domain equation using a harmonic balance approach.

Let $x_{in}=S_i \cos(\omega_c t)+S_q \sin(\omega_c t)$ or $x_{in}=S_i \cos(\omega_c t)-S_q \sin(\omega_c t)$, where $S_i$ and $S_q$ denote input I-channel and Q-channel signals, respectively, and $\omega c$ is a carrier angular frequency. $x_{in}=S_i \cos(\omega_c t)+S_q \sin(\omega_c t)$ or $x_{in}=S_i \cos(\omega_c t)-S_q \sin(\omega_c t)$ are substituted into the equation in the step 3), and coefficients in front of $\cos(\omega_c t)$ and $\sin(\omega_c t)$ are extracted using the harmonic balance approach to obtain the baseband-continuous time-domain equation:

$$L_2 \frac{dX_2}{dt} - iL_2\omega_c X_2 = Y \quad (14)$$

$$\frac{d^2 X_3}{dt^2} - (\omega_c)^2 X_3 - i2\omega_c \frac{dX_3}{dt} + \frac{1}{C_1 + C_{GS}} \frac{1}{L_1} X_3 = \frac{C_1}{C_1 + C_{GS}} \left[\frac{d^2 X_{in}}{dt^2} - (\omega_c)^2 X_{in} - i2\omega_c \frac{dX_{in}}{dt}\right] \quad (15)$$

$$\frac{y}{-R_{out}} - \beta_n \lambda (V_{GQ} - V_{TH})^2 Y = \quad (16)$$

$$X_2 + 2\beta_n(V_{GQ} - V_{TH})(1 + \lambda V_{DQ})X_3 + \beta_n \lambda \left[\frac{1}{2}Y|X_3|^2 + \frac{1}{4}Y*(X_3)^2\right]$$

where $X_{in}$ denotes an input baseband signal, $Y$ denotes a baseband output signal, $X_2$ and $X_3$ denote state variables, i denotes an imaginary unit, and $Y^*$ denotes the conjugate of $Y$.

5) Performing Laplace transform on the baseband-continuous time-domain equations for the memory-based linear subsystem to obtain a Laplace transform expression.

$$\frac{X_{2,s}}{Y_s} = \frac{1}{sL_2 - iL_2\omega_c} \quad (17)$$

$$\frac{d^2 X_3}{dt^2} - (\omega_c)^2 X_3 - i2\omega_c \frac{dX_3}{dt} + \frac{1}{C_1 + C_{GS}} \frac{1}{L_1} X_3 = \frac{C_1}{C_1 + C_{GS}} \left[\frac{d^2 X_{in}}{dt^2} - (\omega_c)^2 X_{in} - i2\omega_c \frac{dX_{in}}{dt}\right] \quad (18)$$

where a subscript s denotes the Laplace transform of the corresponding variable.

6) Transforming the Laplace transform expression into a discrete frequency-domain system of equations using bilinear z-transform.

Let $$s = \frac{2}{T}\left(\frac{z-1}{z+1}\right),$$

where $T$ denotes a baseband sampling period, and $z$ denotes a parameter.

$$s = \frac{2}{T}\left(\frac{z-1}{z+1}\right)$$

is substituted into the equation obtained in the step 5) to obtain the discrete frequency-domain system of equations after reorganization:

$$\frac{X_{2,s}}{Y_s} = \frac{\frac{1}{\frac{2}{T}L_2 - iL_2\omega_c} + \frac{1}{\frac{2}{T}L_2 - iL_2\omega_c}z^{-1}}{1 + \frac{-iL_2\omega_c - \frac{2}{T}L_2}{\frac{2}{T}L_2 - iL_2\omega_c}z^{-1}} \quad (19)$$

$$\frac{X_{3,s}}{X_{in,s}} = \frac{\frac{C_1}{C_1 + C_{GS}}\left[\left(\frac{2}{T} - i\omega_c\right)^2 - 2\left[\left(\frac{2}{T}\right)^2 + (\omega_c)^2\right]z^{-1} + \left(\frac{2}{T} + i\omega_c\right)^2 z^{-2}\right]}{\left[\left(\frac{2}{T} - i\omega_c\right)^2 + \frac{C_1}{C_1 + C_{GS}}\frac{1}{L_1}\right]\left\{1 + \frac{2\left(\frac{C_1}{C_1 + C_{GS}}\frac{1}{L_1} - (\omega_c)^2 - \left(\frac{2}{T}\right)^2\right)}{\left[\left(\frac{2}{T} - i\omega_c\right)^2 + \frac{C_1}{C_1 + C_{GS}}\frac{1}{L_1}\right]}z^{-1} + \frac{\left[\left(\frac{2}{T} + i\omega_c\right)^2 + \frac{C_1}{C_1 + C_{GS}}\frac{1}{L_1}\right]}{\left[\left(\frac{2}{T} - i\omega_c\right)^2 + \frac{C_1}{C_1 + C_{GS}}\frac{1}{L_1}\right]}z^{-2}\right\}} \quad (20)$$

7) Performing inverse z-transform on the discrete frequency-domain system of equations obtained in the step 6) and reorganizing to obtain a system of difference equations with constant coefficient.

$$X_2(n) = -\left[\frac{-iL_2\omega_c - \frac{2}{T}L_2}{\frac{2}{T}L_2 - iL_2\omega_c}\right]X_2(n-1) + \left[\frac{1}{\frac{2}{T}L_2 - iL_2\omega_c}\right]Y(n) + \left[\frac{1}{\frac{2}{T}L_2 - iL_2\omega_c}\right]Y(n-1) \quad (21)$$

$$X_3(n) = -\left[2\frac{\frac{C_1}{C_1 + C_{GS}}\frac{1}{L_1} - (\omega_c)^2 - \left(\frac{2}{T}\right)^2}{\left(\frac{2}{T} - i\omega_c\right)^2 + \frac{C_1}{C_1 + C_{GS}}\frac{1}{L_1}}\right]X_3(n-1) - \left[\frac{\left(\frac{2}{T} + i\omega_c\right)^2 + \frac{C_1}{C_1 + C_{GS}}\frac{1}{L_1}}{\left(\frac{2}{T} - i\omega_c\right)^2 + \frac{C_1}{C_1 + C_{GS}}\frac{1}{L_1}}\right]X_3(n-2) + \left[\frac{\frac{C_1}{C_1 + C_{GS}}}{\left(\frac{2}{T} - i\omega_c\right)^2 + \frac{C_1}{C_1 + C_{GS}}\frac{1}{L_1}}\right] \times \left[\left(\frac{2}{T} - i\omega_c\right)^2 X_{in}(n) - 2\left[\left(\frac{2}{T}\right)^2 + (\omega_c)^2\right]X_{in}(n-1) + \left(\frac{2}{T} + i\omega_c\right)^2 X_{in}(n+1)\right] \quad (22)$$

where n denotes a discrete time sequence number.

8) Discretizing and reorganizing the baseband-continuous time-domain equations for the memoryless nonlinear subsystem obtained in the step 4) to obtain baseband-discrete time-domain equations for the memoryless nonlinear subsystem.

$$\left[-\frac{1}{R_{out}} - \beta_n\lambda(V_{GQ} - V_{TH})^2\right] Y(n) = \quad (23)$$

$$X_2(n) + 2\beta_n(V_{GQ} - V_{TH})(1 + \lambda V_{DQ})X_3(n) +$$

$$\beta_n\lambda\left[\frac{1}{2}Y(n)|X_3(n)|^2 + \frac{1}{4}Y*(n)(X_3(n))^2\right]$$

9) Reorganizing the system of difference equations with constant coefficient obtained in the step 7) and the baseband-discrete time-domain equations for the memoryless nonlinear subsystem obtained in the step 8) to obtain a baseband-discrete time-domain nonlinear model of the RF power amplifier system.

$$\left(\frac{1}{2}\beta_n\lambda|X_3(n)|^2 + k_y\right)Y(n) + \frac{1}{4}\beta_n\lambda(X_3(n))^2 Y*(n) = -(X_{21}(n) + k_3 X_3(n)) \quad (24)$$

$$X_{21}(n) = -a_{21,1}X_{21}(n-1) + b_{y,1}Y(n-1) \quad (25)$$

$$X_3(n) = -a_{3,1}X_3(n-1) - a_{3,2}X_3(n-2) + \quad (26)$$

$$[b_{in,0}X_{in}(n) + b_{in,1}X_{in}(n-1) + b_{in,2}X_{in}(n-2)]$$

wherein $X_{21}$ denotes the state variable.

$$k_3 = 2\beta_n(V_{GQ} - V_{TH})(1 + \lambda V_{DQ}) \quad (27)$$

$$k_y = \left[\frac{1}{R_{out}} + \beta_n\lambda(V_{GQ} - V_{TH})^2 + \frac{1}{\frac{2}{T}L_2 - iL_2\omega_c}\right] \quad (28)$$

$$a_{21,1} = \left[\frac{-iL_2\omega_c - \frac{2}{T}L_2}{\frac{2}{T}L_2 - iL_2\omega_c}\right] \quad (29)$$

$$b_{y,1} = \left(1 - \left[\frac{-iL_2\omega_c - \frac{2}{T}L_2}{\frac{2}{T}L_2 - iL_2\omega_c}\right]\right)\left[\frac{1}{\frac{2}{T}L_2 - iL_2\omega_c}\right] \quad (30)$$

$$a_{3,1} = \left[2\frac{\frac{C_1}{C_1+C_{GS}}\frac{1}{L_1} - (\omega_c)^2 - \left(\frac{2}{T}\right)^2}{\left(\frac{2}{T} - i\omega_c\right)^2 + \frac{C_1}{C_1+C_{GS}}\frac{1}{L_1}}\right] \quad (31)$$

$$a_{3,2} = \left[\frac{\left(\frac{2}{T} + i\omega_c\right)^2 + \frac{C_1}{C_1+C_{GS}}\frac{1}{L_1}}{\left(\frac{2}{T} - i\omega_c\right)^2 + \frac{C_1}{C_1+C_{GS}}\frac{1}{L_1}}\right] \quad (32)$$

$$b_{in,0} = \left(\frac{2}{T} - i\omega_c\right)^2\left[\frac{\frac{C_1}{C_1+C_{GS}}}{\left(\frac{2}{T} - i\omega_c\right)^2 + \frac{1}{C_1+C_{GS}}\frac{1}{L_1}}\right] \quad (33)$$

$$b_{in,1} = -2\left[\left(\frac{2}{T}\right)^2 + (\omega_c)^2\right]\left[\frac{\frac{C_1}{C_1+C_{GS}}}{\left(\frac{2}{T} - i\omega_c\right)^2 + \frac{1}{C_1+C_{GS}}\frac{1}{L_1}}\right] \quad (34)$$

$$b_{in,2} = \left(\frac{2}{T} + i\omega_c\right)^2\left[\frac{\frac{C_1}{C_1+C_{GS}}}{\left(\frac{2}{T} - i\omega_c\right)^2 + \frac{1}{C_1+C_{GS}}\frac{1}{L_1}}\right] \quad (35)$$

Figure 3:
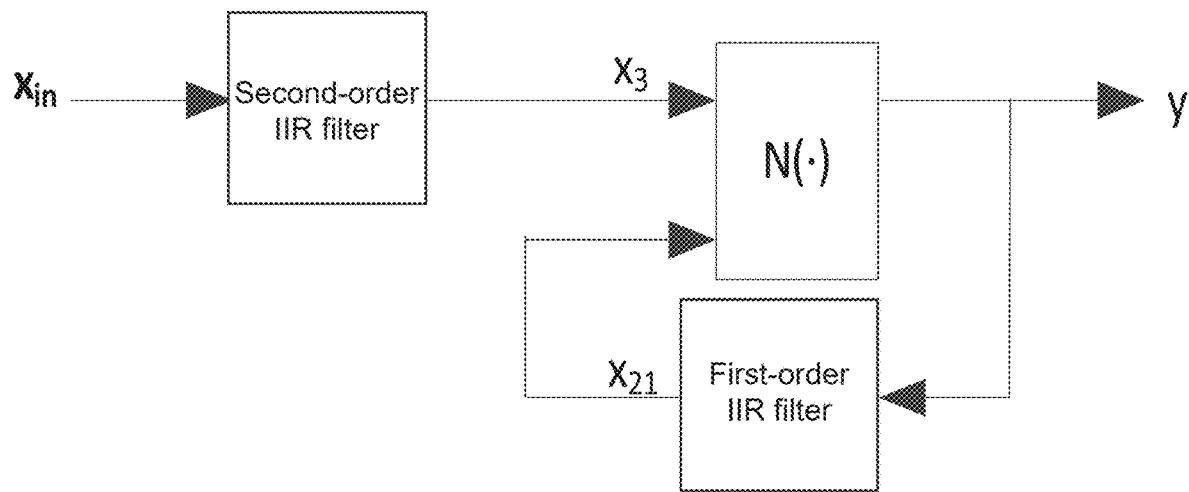
FIG. 3 is a schematic structural diagram illustrating an RF power amplifier nonlinear model according to some embodiments of the present disclosure.
Figure 4:
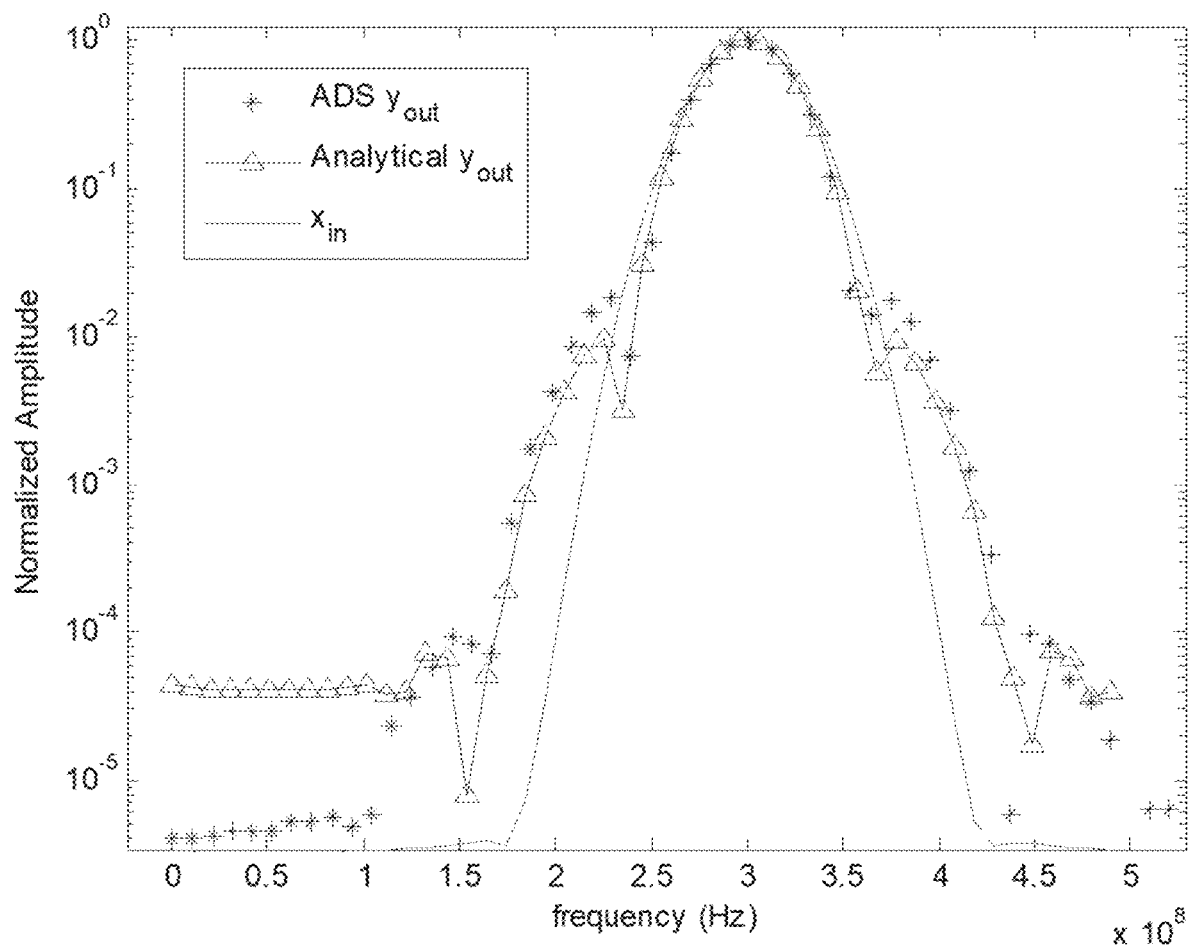
FIG. 4 is a schematic diagram illustrating comparison of an output signal spectrum calculated by a nonlinear model and an output signal spectrum simulated by commercial circuit level simulation software according to some embodiments of the present disclosure.

As shown in FIG. 3, a system block diagram corresponding to the nonlinear model obtained in the step 9) of this embodiment is given. FIG. 4 shows comparison between an output signal spectrum calculated by the nonlinear model obtained in the step 9) of this embodiment and an output signal spectrum obtained based on commercial circuit level simulation software. It can be seen that the results obtained by the method for forward synthesis of the digital predistortion nonlinear model derived from the circuit description provided by the present disclosure are consistent with circuit level simulation results, which proves the effectiveness of the present disclosure. FIG. 3 and FIG. 4 show that the method for forward synthesis of the digital predistortion nonlinear model derived from the circuit description provided by the present disclosure can provide an accurate model structure and initial parameter values for the establishment of the RF power amplifier model in the power amplifier nonlinear predistortion technology. By further optimization accordingly, a high-precision and low-complexity RF power amplifier predistortion model can be obtained.

Figure 5:
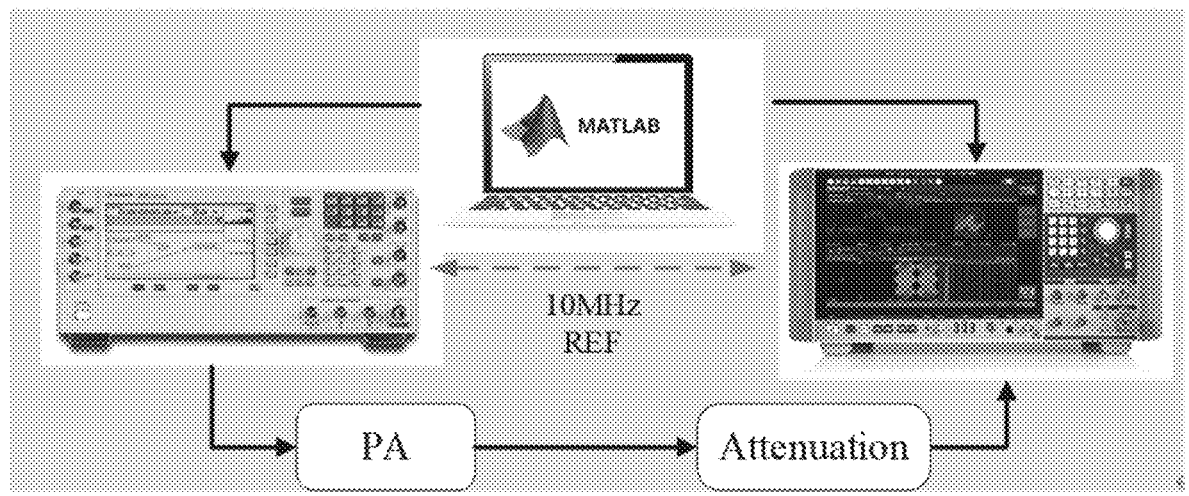
FIG. 5 is a schematic diagram illustrating a nonlinear effect test of a GaN power amplifier.
Figure 6:
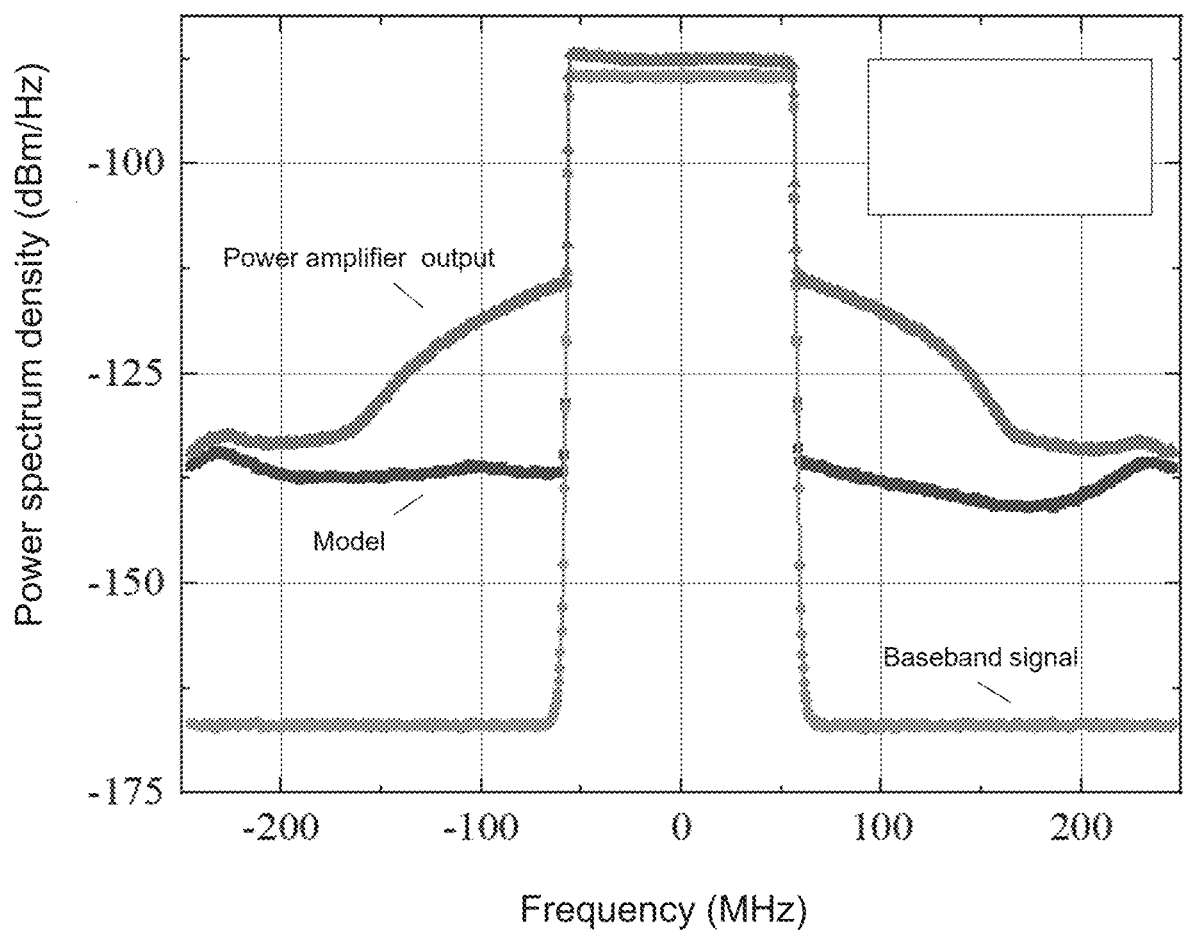
FIG. 6 is a schematic diagram illustrating a spectrum of a baseband signal, a spectrum of a power amplifier output signal, and a spectrum after model calibration.

The method of the present disclosure is applied to nonlinear modeling of a (manufacturer: MACOM) GaN power amplifier with a frequency band of 3.86 GHz and a gain of 18 dB. An OFDM baseband signal with a bandwidth of 100 MHz is used for testing. The schematic diagram of a test system is shown in FIG. 5. FIG. 7 is a diagram illustrating nonlinear suppression effect of a power amplifier using the nonlinear model provided by the present disclosure. It can be found that after the model is used, an adjacent channel power ratio is improved by >13 dBc, which indicates that the method for forward synthesis of the digital predistortion nonlinear model derived from the circuit description provided by the present disclosure can establish an effective nonlinear predistortion model to improve the adjacent channel power ratio of the system.

In summary, according to the method for forward synthesis of the digital predistortion nonlinear model derived from the circuit description provided by the present disclosure, the present disclosure can obtain the corresponding DPD nonlinear model by forward synthesis through the existing equivalent circuit model of the RF power amplifier system, and can provide an accurate model structure and initial parameter values for establishing the RF power amplifier model in the power amplifier nonlinear predistortion technology. The present disclosure makes full use of the prior knowledge of the RF power amplifier system to obtain the nonlinear model structure that best conforms to the physical essence. In addition, the present disclosure can directly obtain the minimum memory depth and nonlinear order, and can be integrated into an RF power amplifier circuit simulation software.

Example 2

The present disclosure further provides a system for forward synthesis of a digital predistortion nonlinear model derived from circuit description, which is used for nonlinear modeling of a power amplifier, comprising:

a model acquisition module configured to obtain an equivalent circuit model of an RF power amplifier system;

an equation establishment module configured to establish a frequency band-continuous time-domain integro-differential equation system based on the equivalent circuit model;

a simplification and reorganization module configured to simplify and reorganize the frequency band-continuous time-domain integro-differential equation system to transform the frequency band-continuous time-domain integro-differential equation into a combination of frequency band-continuous time-domain integro-differential equations for a memory-based linear subsystem and frequency band-continuous time-domain equations for a memoryless nonlinear subsystem;

an equation transform module configured to transform a frequency band-continuous time-domain integro-differential equation into a baseband-continuous time-domain equation using a harmonic balance approach, including transforming the frequency band-continuous time-domain integro-differential equations for the memory-based linear subsystem into baseband-continuous time-domain equations for the memory-based linear subsystem, and transforming the frequency band-continuous time-domain equations for the memoryless nonlinear subsystem into a baseband-continuous time-domain equations for the memoryless nonlinear subsystem;

a Laplace transform module configured to perform Laplace transform on the baseband-continuous time-domain equations for the memory-based linear subsystem to obtain a Laplace transform expression;

a bilinear z-transform module configured to transform the Laplace transform expression into a discrete frequency-domain system of equations using bilinear z-transform;

an inverse z-transform module configured to perform inverse z-transform on the discrete frequency-domain system of equations and reorganize to obtain a system of difference equations with constant coefficient;

a discretization module configured to discretize and reorganize the baseband-continuous time-domain equations for the memoryless nonlinear subsystem to obtain baseband-discrete time-domain equations for the memoryless nonlinear subsystem; and a reorganization module configured to reorganize the system of difference equations with constant coefficient and the baseband-discrete time-domain equations for the memoryless nonlinear subsystem to obtain a baseband-discrete time-domain nonlinear model of the RF power amplifier system.

The above content is a further detailed description of the present disclosure in combination with specific embodiments. It cannot be determined that the specific embodiments of the present disclosure are limited to these. For those having ordinary skills in the art to which the present disclosure belongs, they can make several simple deductions or substitutions without departing from the concept of the present disclosure, which should be regarded as belonging to the scope of patent protection determined by the claims submitted by the present disclosure.

What is claimed is:

1. A method for forward synthesis of a digital predistortion nonlinear model derived from a circuit description, used for nonlinear modeling of a power amplifier, comprising:
1. Obtaining an equivalent circuit model of a radio frequency (RF) power amplifier system, wherein
   in the RF power amplifier system, a transistor is modeled by equivalent gate capacitance $C_{GS}$ and drain-source current $I_{DS}$, a bias network is composed of inductors and capacitors, and input and output matching networks only retain coupling capacitors, and
   in the step 1), the equivalent circuit model includes a thermal effect and a trap effect of the transistor, and the transistor adopts a GaN device;
2) establishing, based on the equivalent circuit model, a frequency band-continuous time-domain integro-differential equation system, wherein the frequency band-continuous time-domain integro-differential equation system is expressed as:

$$V_{GS} = V_{GQ} + v_{GS} \tag{1}$$

$$V_{DS} = V_{DQ} + v_{DS} \tag{2}$$

$$v_{GS} = L_1 \frac{di_t}{dt} \tag{3}$$

$$v_{ds} = L_2 \frac{di_2}{dt} \tag{4}$$

$$C_1 \frac{d(v_{GS} - v_{in})}{dt} + i_1 + C_{GS} \frac{dv_{GS}}{dt} = 0 \tag{5}$$

$$C_4 \frac{d(v_{DS} - v_{out})}{dt} + i_2 + I_{DS} = 0 \tag{6}$$

$$C_4 \frac{d(v_{DS} - v_{out})}{dt} = \frac{v_{out}}{R_{out}} \tag{7}$$

$$I_{DS} = \beta_n (V_{GS} - V_{TH})^2 (1 + \lambda V_{DS}), \tag{8}$$

where $V_{GS}$ and $V_{DS}$ are a gate source voltage and a drain source voltage, respectively; $V_{GQ}$ and $V_{DQ}$ are gate and drain DC bias voltages, respectively, $V_{GS}$ and $V_{DS}$ are gate and drain AC voltages, respectively, $L_1$ and $L_2$ are inductors, $i_1$ and $i_2$ are a current, respectively, t is time, $C_1$ and $C_4$ are capacitors, $v_{in}$ and $v_{out}$ are input and output AC voltages, respectively, $\beta_n$ is an amplification factor, $V_{TH}$ is a threshold voltage, $\lambda$ is a channel length modulation coefficient, and $R_{out}$ is load resistance;

3) simplifying and reorganizing the frequency band-continuous time-domain integro-differential equation system obtained in the step 2) to transform the frequency band-continuous time-domain integro-differential equation into a combination of frequency band-continuous time-domain integro-differential equations for a memory-based linear subsystem and frequency band-continuous time-domain equations for a memoryless nonlinear subsystem, wherein the frequency band-continuous time-domain integro-differential equations for the memory-based linear subsystem is expressed as:

$$\frac{dx_1}{dt} = \frac{1}{L_1} x_3 \tag{9}$$

$$\frac{dx_2}{dt} = \frac{1}{L_2} x_4 \tag{10}$$

$$\frac{dx_3}{dt} = \frac{C_1}{C_1 + C_{GS}} \frac{dv_{in}}{dt} - \frac{1}{C_1 + C_{GS}} x_1 \tag{11}$$

$$\frac{dx_4}{dt} = \frac{1}{R_{out} C_4} y + \frac{dy}{dt}, \tag{12}$$

where $x_1$, $x_2$, $x_3$ and $x_4$ are unknown state variables, and y is an output, and the frequency band-continuous time-domain equations for the memoryless nonlinear subsystem is expressed as:

$$y = \frac{[-(x_2 + I_{DQ}) - \beta_n((x_3 + V_{GQ}) - V_{TH})^2 (1 + \lambda(x_4 + V_{DQ}))]}{R_{out}} \tag{13},$$

where $I_{DQ}$ is a drain bias current;

4) transforming a frequency band-continuous time-domain integro-differential equation into a baseband-continuous time-domain equation using a harmonic balance approach, including transforming the frequency band-continuous time-domain integro-differential equations for the memory-based linear subsystem integro-differential equation obtained in the step 3) into baseband-continuous time-domain integro-differential equations for the memory-based linear subsystem, and transforming the frequency band-continuous time-domain equations for the memoryless nonlinear subsystem obtained in the step 3) into baseband-continuous time-domain equations for the memoryless nonlinear subsystem;

5) Performing Laplace transform on the baseband-continuous time-domain equations for the memory-based linear subsystem to obtain a Laplace transform expression;

6) Transforming the Laplace transform expression obtained in the step 5) into a discrete frequency-domain system of equations using bilinear z-transform;

7) Performing inverse z-transform on the discrete frequency-domain system of equations obtained in the step 6) and reorganizing to obtain a system of difference equations with constant coefficient;

8) Discretizing and reorganizing the baseband-continuous time-domain equations for the memoryless nonlinear subsystem obtained in the step 4) to obtain baseband-discrete time-domain equations for the memoryless nonlinear subsystem; and 9) Reorganizing the system of difference equations with constant coefficient obtained in the step 7) and the baseband-discrete time-domain equations for the memoryless nonlinear subsystem obtained in the step 8) to obtain a baseband-discrete time-domain nonlinear model of the RF power amplifier system.

2. The method of claim 1, wherein the frequency band-continuous time-domain integro-differential equation system in the step 2) is obtained by transforming the equivalent circuit model in the step 1) based on the Kirchhoff's law and network parameter expression transform.

3. The method of claim 2, wherein the network parameter expression transform is configured to process distributed parameter elements in the equivalent circuit model of the step 1).

4. The method of claim 1, wherein the step 3) is achieved by decoupling an integro-differential operation and a nonlinear operation on a nonlinear equation in the frequency band-continuous time-domain integro-differential equation system obtained in the step 2).

5. The method of claim 1, wherein the simplifying described in the step 3) is achieved by selecting state variables as unknown quantities through a state space approach to eliminate other unknown quantities, so as to reduce a count of unknown quantities and a count of equations in the integro-differential equation to simplify equation expression.

6. The method of claim 1, wherein in the step 4), the transforming a frequency band-continuous time-domain integro-differential equation into a baseband-continuous time-domain equation includes substituting carrier modulation time-domain expressions of I-channel and Q-channel signals of input signals into the equations obtained in the step 3) and then reorganizing fundamental wave terms using the harmonic balance approach.

7. The method of claim 6, further including:

letting $x_{in}=S_i \cos(\omega_c t)+S_q \sin(\omega_c t)$ or $x_{in}=S_i \cos(\omega_c t)-S_q \sin(\omega_c t)$, where $S_i$ and $S_q$ denote input I-channel and Q-channel signals, respectively, and $\omega c$ is a carrier angular frequency;

substituting $x_{in}=S_i \cos(\omega_c t)+S_q \sin(\omega_c t)$ or $x_{in}=S_i \cos(\omega_c t)-S_q \sin(\omega_c t)$ into the equation in the step 3);

extracting coefficients in front of $\cos(\omega_c t)$ and $\sin(\omega_c t)$ using the harmonic balance approach to obtain the baseband-continuous time-domain equation:

$$L_2 \frac{dX_2}{dt} - iL_2\omega_c X_2 = Y \quad (14)$$

$$\frac{d^2 X_3}{dt^2} - (\omega_c)^2 X_3 - i2\omega_c \frac{dX_3}{dt} + \frac{1}{C_1+C_{GS}} \frac{1}{L_i} X_3 = \frac{C_1}{C_1+C_{GS}}\left[\frac{d^2 X_{in}}{dt^2} - (\omega_c)^2 X_{in} - i2\omega_c \frac{dX_{i\_n}}{dt}\right] \quad (15)$$

$$\frac{Y}{-R_{out}} - \beta_n \lambda (V_{GQ} - V_{TH})^2 Y = X_2 + 2\beta_n(V_{GQ} - V_{TH})(1+\lambda V_{DQ})X_3 + \beta_n \lambda \left[\frac{1}{2} y |X_3|^2 + \frac{1}{4} Y^*(X_3)^2\right], \quad (16)$$

where $X_{in}$ denotes an input baseband signal, Y denotes a baseband output signal, $X_2$ and $X_3$ denote state variables, i denotes an imaginary unit, and $Y^*$ denotes the conjugate of Y; and performing Laplace transform on the baseband-continuous time-domain equations for the memory-based linear subsystem to obtain a Laplace transform expression:

$$\frac{X_{2,s}}{Y_s} = \frac{1}{sL_2 - iL_2\omega_c} \quad (17)$$

$$\frac{d^2 X_3}{dt^2} - (\omega_c)^2 X_3 - i2\omega_c \frac{dX_3}{dt} + \frac{1}{C_1+C_{GS}} \frac{1}{L_1} X_3 = \frac{C_1}{C_1+C_{GS}}\left[\frac{d^2 X_{in}}{dt^2} - (\omega_c)^2 X_{in} - i2\omega_c \frac{dX_{in}}{dt}\right], \quad (18)$$

where a subscript s denotes the Laplace transform of the corresponding variable.

8. The method of claim 7, further including:

letting $$s = \frac{2}{T}\left(\frac{z-1}{z+1}\right),$$

where T denotes a baseband sampling period, and z denotes a parameter;

substituting $$s = \frac{2}{T}\left(\frac{z-1}{z+1}\right)$$

into the equation obtained in the step 5) to obtain the discrete frequency-domain system of equations after reorganization:

$$\frac{X_{2,s}}{Y_s} = \frac{\frac{1}{\frac{2}{T}L_2 - iL_2\omega_c} + \frac{1}{\frac{2}{T}L_2 - iL_2\omega_c}z^{-1}}{1 + \frac{-iL_2\omega_c - \frac{2}{T}L_2}{\frac{2}{T}L_2 - iL_2\omega_c}z^{-1}} \qquad (19)$$

$$\frac{X_{3,s}}{X_{in,s}} = \frac{\dfrac{\dfrac{C_1}{C_1+C_{GS}}}{\left[\left(\dfrac{2}{T}-i\omega_c\right)^2 + \dfrac{1}{C_1+C_{GS}}\dfrac{1}{L_1}\right]}\left[\left(\dfrac{2}{T}-i\omega_c\right)^2 - 2\left[\left(\dfrac{2}{T}\right)^2 + (\omega_c)^2\right]z^{-1} + \left(\dfrac{2}{T}+i\omega_c\right)^2 z^{-2}\right]}{1 + \dfrac{2\left(\dfrac{1}{C_1+C_{GS}}\dfrac{1}{L_1} - (\omega_c)^2 - \left(\dfrac{2}{T}\right)^2\right)}{\left[\left(\dfrac{2}{T}-i\omega_c\right)^2 + \dfrac{1}{C_1+C_{GS}}\dfrac{1}{L_1}\right]}z^{-1} + \dfrac{\left[\left(\dfrac{2}{T}+i\omega_c\right)^2 + \dfrac{1}{C_1+C_{GS}}\dfrac{1}{L_1}\right]}{\left[\left(\dfrac{2}{T}-i\omega_c\right)^2 + \dfrac{1}{C_1+C_{GS}}\dfrac{1}{L_1}\right]}z^{-2}}; \text{ and} \qquad (20)$$

performing inverse z-transform on the discrete frequency-domain system of equations obtained in the step 6) and reorganizing to obtain a system of difference equations with constant coefficient:

$$X_2(n) = -\left[\frac{-iL_2\omega_c - \frac{2}{T}L_2}{\frac{2}{T}L_2 - iL_2\omega_c}\right]X_2(n-1) + \qquad (21)$$

$$\left[\frac{1}{\frac{2}{T}L_2 - iL_2\omega_c}\right]Y(n) + \left[\frac{1}{\frac{2}{T}L_2 - iL_2\omega_c}\right]Y(n-1)$$

$$X_3(n) = -\left[2\frac{\frac{1}{C_1+C_{GS}}\frac{1}{L_1} - (\omega_c)^2 - \left(\frac{2}{T}\right)^2}{\left(\frac{2}{T}-i\omega_c\right)^2 + \frac{1}{C_1+C_{GS}}\frac{1}{L_1}}\right]X_3(n-1) - \left[\frac{\left(\frac{2}{T}+i\omega_c\right)^2 + \frac{1}{C_1+C_{GS}}\frac{1}{L_1}}{\left(\frac{2}{T}-i\omega_c\right)^2 + \frac{1}{C_1+C_{GS}}\frac{1}{L_1}}\right]X_3(n-2) + \qquad (22)$$

$$\left[\frac{\frac{C_1}{C_1+C_{GS}}}{\left(\frac{2}{T}-i\omega_c\right)^2 + \frac{1}{C_1+C_{GS}}\frac{1}{L_1}}\right] \times \left[\left(\frac{2}{T}-i\omega_c\right)^2 X_{in}(n) - 2\left[\left(\frac{2}{T}\right)^2 + (\omega_c)^2\right]X_{in}(n-1) + \left(\frac{2}{T}+i\omega_c\right)^2 X_{in}(n-2)\right],$$

where n denotes a discrete time sequence number.

9. The method of claim 8, wherein the baseband-discrete time-domain equations for the memoryless nonlinear subsystem is expressed as:

$$\left[-\frac{1}{R_{out}} - \beta_n\lambda(V_{GQ}-V_{TH})^2\right]Y(n) = \qquad (23)$$

$$X_2(n) + 2\beta_n(V_{GQ}-V_{TH})(1+\lambda V_{DQ})X_3(n) +$$

$$\beta_n\lambda\left[\frac{1}{2}y(n)|X_3(n)|^2 + \frac{1}{4}Y^*(n)(X_3(n))^2\right].$$

10. The method of claim 9, wherein the baseband-discrete time-domain nonlinear model of the RF power amplifier system is expressed as:

$$\left(\frac{1}{2}\beta_n\lambda|X_3(n)|^2 + k_y\right)Y(n) + \frac{1}{4}\beta_n\lambda(X_3(n))^2 Y^*(n) = -(X_{21}(n) + k_3 X_3(n)) \qquad (24)$$

$$X_{21}(n) = -a_{21,1}X_{21}(n-1) + b_{y,1}y(n-1) \qquad (25)$$

$$X_3(n) = -a_{3,1}X_3(n-1) - a_{3,2}X_3(n-2) + [ \qquad (26)$$

$$b_{in,0}X_{in}(n) + b_{in,1}X_{in}(n-1) + b_{in,2}X_{in}(n-2)]$$

wherein $X_{21}$ denotes the state variable $$k_3 = 2\beta_n(V_{GQ}-V_{TH})(1+\lambda V_{DQ}) \qquad (27)$$

$$k_y = \left[\frac{1}{R_{out}} + \beta_n\lambda(V_{GQ}-V_{TH})^2 + \frac{1}{\frac{2}{T}L_2 - iL_2\omega_c}\right] \qquad (28)$$

$$a_{21,1} = \left[\frac{-iL_2\omega_c - \frac{2}{T}L_2}{\frac{2}{T}L_2 - iL_2\omega_c}\right] \qquad (29)$$

$$b_{y,1} = \left(1 - \left[\frac{-iL_2\omega_c - \frac{2}{T}L_2}{\frac{2}{T}L_2 - iL_2\omega_c}\right]\right)\left[\frac{1}{\frac{2}{T}L_2 - iL_2\omega_c}\right] \qquad (30)$$

$$a_{3,1} = \left[2\frac{\frac{1}{C_1+C_{GS}}\frac{1}{L_1} - (\omega_c)^2 - \left(\frac{2}{T}\right)^2}{\left(\frac{2}{T}-i\omega_c\right)^2 + \frac{1}{C_1+C_{GS}}\frac{1}{L_1}}\right] \qquad (31)$$

$$a_{3,2} = \left[\frac{\left(\frac{2}{T}+i\omega_c\right)^2 + \frac{1}{C_1+C_{GS}}\frac{1}{L_1}}{\left(\frac{2}{T}-i\omega_c\right)^2 + \frac{1}{C_1+C_{GS}}\frac{1}{L_1}}\right] \qquad (32)$$

$$b_{in,0} = \left(\frac{2}{T}-i\omega_c\right)^2\left[\frac{\frac{C_1}{C_1+C_{GS}}}{\left(\frac{2}{T}-i\omega_c\right)^2 + \frac{1}{C_1+C_{GS}}\frac{1}{L_1}}\right] \qquad (33)$$

$$b_{in,1} = -2\left[\left(\frac{2}{T}\right)^2 + (\omega_c)^2\right]\left[\frac{\frac{C_1}{C_1+C_{GS}}}{\left(\frac{2}{T}-i\omega_c\right)^2 + \frac{1}{C_1+C_{GS}}\frac{1}{L_1}}\right] \qquad (34)$$

-continued $$b_{in,2} = \left(\frac{2}{T} + i\omega_c\right)^2 \left[\frac{\frac{C_1}{C_1 + C_{GS}}}{\left(\frac{2}{T} - i\omega_c\right)^2 + \frac{1}{C_1 + C_{GS}}\frac{1}{L_1}}\right].$$ (35)

11. A system for forward synthesis of a digital predistortion nonlinear model derived from a circuit description, used for nonlinear modeling of a power amplifier, comprising:
a model acquisition module configured to obtain an equivalent circuit model of an RF power amplifier system, wherein
in the RF power amplifier system, a transistor is modeled by equivalent gate capacitance $C_{GS}$ and drain-source current $I_{DS}$, a bias network is composed of inductors and capacitors, and input and output matching networks only retain coupling capacitors, and
in the step 1), the equivalent circuit model includes a thermal effect and a trap effect of the transistor, and the transistor adopts a GaN device;
an equation establishment module configured to establish a frequency band-continuous time-domain integro-differential equation system based on the equivalent circuit model, wherein the frequency band-continuous time-domain integro-differential equation system is expressed as:

$$V_{GS} = V_{GQ} + v_{GS}$$ (1)

$$V_{DS} = V_{DQ} + v_{DS}$$ (2)

$$v_{GS} = L_1 \frac{di_1}{dt}$$ (3)

$$v_{DS} = L_2 \frac{di_2}{dt}$$ (4)

$$C_1 \frac{d(v_{GS} - v_{in})}{dt} + i_1 + C_{GS}\frac{dv_{GS}}{dt} = 0$$ (5)

$$C_4 \frac{d(v_{DS} - v_{out})}{dt} + i_2 + I_{DS} = 0$$ (6)

$$C_4 \frac{d(v_{DS} - v_{out})}{dt} = \frac{v_{out}}{R_{out}}$$ (7)

$$I_{DS} = \beta_n(V_{GS} - V_{TH})^2(1 + \lambda V_{DS}),$$ (8)

where $V_{GS}$ and $V_{DS}$ are a gate source voltage and a drain source voltage, respectively; $V_{GQ}$ and $V_{DQ}$ are gate and drain DC bias voltages, respectively, $V_{GS}$ and $V_{DS}$ are gate and drain AC voltages, respectively, $L_1$ and $L_2$ are inductors, $i_1$ and $i_2$ are a current, respectively, t is time, $C_1$ and $C_4$ are capacitors, $v_{in}$ and $v_{out}$ are input and output AC voltages, respectively, $\beta_n$ is an amplification factor, $V_{TH}$ is a threshold voltage, $\lambda$ is a channel length modulation coefficient, and $R_{out}$ is load resistance;
a simplification and reorganization module configured to simplify and reorganize the frequency band-continuous time-domain integro-differential equation system to transform the frequency band-continuous time-domain integro-differential equation into a combination of frequency band-continuous time-domain integro-differential equations for a memory-based linear subsystem and frequency band-continuous time-domain equations for a memoryless nonlinear subsystem, wherein
the frequency band-continuous time-domain integro-differential equations for the memory-based linear subsystem is expressed as:

$$\frac{dx_1}{dt} = \frac{1}{L_1}x_3$$ (9)

$$\frac{dx_2}{dt} = \frac{1}{L_2}x_4$$ (10)

$$\frac{dx_3}{dt} = \frac{C_1}{C_1 + C_{GS}}\frac{dv_{in}}{dt} - \frac{1}{C_1 + C_{GS}}x_1$$ (11)

$$\frac{dx_4}{dt} = \frac{1}{R_{out}C_4}y + \frac{dy}{dt},$$ (12)

where $x_1$, $x_2$, $x_3$ and $x_4$ are unknown state variables, and y is an output, and
the frequency band-continuous time-domain equations for the memoryless nonlinear subsystem is expressed as:

$$y = [-(x_2 + I_{DQ}) - \beta_n((x_3 + V_{GQ}) - V_{TH})^2(1 + \lambda(x_4 + V_{DQ}))]R_{out}$$ (13), where $I_{DQ}$ is a drain bias current;
an equation transform module configured to transform the frequency band-continuous time-domain integro-differential equation into a baseband-continuous time-domain equation using a harmonic balance approach, including transforming the frequency band-continuous time-domain integro-differential equations for the memory-based linear subsystem into baseband-continuous time-domain equations for the memory-based linear subsystem, and transforming the frequency band-continuous time-domain equations for the memoryless nonlinear subsystem into baseband-continuous time-domain equations for the memoryless nonlinear subsystem;
a Laplace transform module configured to perform Laplace transform on the baseband-continuous time-domain equations for the memory-based linear subsystem to obtain a Laplace transform expression;
a bilinear z-transform module configured to transform the Laplace transform expression into a discrete frequency-domain system of equations using bilinear z-transform;
an inverse z-transform module configured to perform inverse z-transform on the discrete frequency-domain system of equations and reorganize to obtain a system of difference equations with constant coefficient;
a discretization module configured to discretize and reorganize the baseband-continuous time-domain equations for the memoryless nonlinear subsystem to obtain baseband-discrete time-domain equations for the memoryless nonlinear subsystem; and
a reorganization module configured to reorganize the system of difference equations with constant coefficient and the baseband-discrete time-domain equations for the memoryless nonlinear subsystem to obtain a baseband-discrete time-domain nonlinear model of the RF power amplifier system.

12. The system of claim 11, wherein the frequency band-continuous time-domain integro-differential equation system is obtained by transforming the equivalent circuit model based on the Kirchhoff's law and network parameter expression transform.

13. The system of claim 12, wherein the network parameter expression transform is configured to process distributed parameter elements in the equivalent circuit model.

14. The system of claim 11, wherein the simplifying and reorganizing the frequency band-continuous time-domain integro-differential equation system includes decoupling an integro-differential operation and a nonlinear operation on a nonlinear equation in the frequency band-continuous time-domain integro-differential equation system.

15. The system of claim 11, wherein the simplifying is achieved by selecting state variables as unknown quantities through a state space approach to eliminate other unknown quantities, so as to reduce a count of unknown quantities and a count of equations in the integro-differential equation to simplify equation expression.

16. The system of claim 11, wherein the transforming a frequency band-continuous time-domain integro-differential equation into a baseband-continuous time-domain equation includes substituting carrier modulation time-domain expressions of I-channel and Q-channel signals of input signals into the equations obtained by the simplification and reorganization module, and then reorganizing fundamental wave terms using the harmonic balance approach.

* * * * *